United States Patent [19]
Lampe et al.

[11] Patent Number: 5,476,014
[45] Date of Patent: Dec. 19, 1995

[54] PROCESS AND A DEVICE FOR THE ROTATION-ANGLE-MONITORED TIGHTENING OR LOOSENING OF SCREW CONNECTIONS

[75] Inventors: Markus Lampe, Herrenberg-Affstaett; Torsten Schmidt, Oberkochen; Edgar von Hinueber, Dudweiler, all of Germany

[73] Assignee: Mercedes-Benz AG, Stuttgart, Germany

[21] Appl. No.: 171,712

[22] Filed: Dec. 21, 1993

[30] Foreign Application Priority Data

Dec. 21, 1992 [DE] Germany ............ 42 43 317.7
Jun. 4, 1993 [DE] Germany ............ 43 18 551.7
Jul. 23, 1993 [DE] Germany ............ 93 11 013 U

[51] Int. Cl.$^6$ .................................................. G02L 3/02
[52] U.S. Cl. .................................. 73/862.23; 73/862.21
[58] Field of Search ........................ 73/862.21, 862.22, 73/862.23

[56] References Cited

U.S. PATENT DOCUMENTS 5,172,616  12/1992  Negishi ..................... 81/479

FOREIGN PATENT DOCUMENTS 2661743  11/1991  France.
3504278   8/1986  Germany.
3832080A  4/1989  Germany.
4243317A  6/1993  Germany.

OTHER PUBLICATIONS

Database WPI, Derwent Pubications Ltd., London, AN 78–E 5834 A&BE–A, 863 705 (Rockwell) 29 May 1978.

Primary Examiner—Richard Chilcot
Assistant Examiner—Elizabeth L. Dougherty
Attorney, Agent, or Firm—Evenson, McKeown, Edwards & Lenahan

[57] ABSTRACT

The invention relates to a process and a device for the rotation-angle-monitored tightening or loosening of screw connections by means of power driven tools. The absolute rotation angle swept over in the screwing operation with respect to a fixed point about a swivel axis through the rotation axis of the screw connection is measured. An advantageous, relative-position free, absolute measurement of the rotation angle is effected by the use of an absolute rotation-rate measuring sensor. The rotation-rate sensor can herein be configured as a mechanical, compass-like gyroscope, as a rotation sensor or as an acceleration sensor, by means of which a measured value correlated with the absolute rotation angle can be recorded.

36 Claims, 4 Drawing Sheets

PROCESS AND A DEVICE FOR THE ROTATION-ANGLE-MONITORED TIGHTENING OR LOOSENING OF SCREW CONNECTIONS

BACKGROUND AND SUMMARY OF THE INVENTION

The invention relates to a process and a device for the rotation-angle-monitored tightening or loosening of screw connections of the type generally described in German patent document DE 32 21 658 A1.

German patent document DE 32 21 658 A1 relates to a torque spanner having an associated plug-in insert—hereinafter referred to as a socket or socket—for a threaded screw nut, to be screw or threadably connected, for the partial checking of screw connections, in which torque spanner the attainment of the yield point of a screw connection is ascertained and indicated by torque measurements. The torque spanner exhibits a torque meter for measuring the exerted torque, an angle transmitter for measuring the rotation of the torque spanner in relation to a fixed reference point and an analyzing and indicating device for the determined values. For the measurement of the rotation angle, an enclosure housing, concentrically surrounding the socket, is applied fixedly to the workpiece, which is disposed pivotably about the swivel axis of the torque spanner, which swivel axis is aligned parallel to the screwdriver shaft of the torque spanner. This securement of this one enclosure housing predefining, with respect to the rotation angle, a fixed spatial point is effected by means of a rigid axle and a fastening unit disposed on the rigid axle, e.g. a magnet or a further socket secured to an adjacent screw nut. For devices which are designed for the tightening of a large number of differently disposed screws, this securement is not suitable however, since the configuration of the rigid axle and the fastening unit have to be matched for each type of screw connection. Furthermore, the rigid axle, in particular, exhibits a spatial extent which makes handling of this type of device more difficult or which, partly for space reasons, prevents it from being used.

From German patent document DE 31 27 753 A1, a hand-guided, power-operated screwdriver or torque spanner is known, such as is used, for example, for the assembly of motor vehicles. The power-operated screwdriver is provided, for the recording of a torque/rotation-angle diagram, with a torque-measuring device and with a rotation-angle-measuring device, the torque/rotation-angle diagram serving to monitor a realized screw connection. The torque-measuring device is designed to measure the torque delivered to the screwdriver shaft. The rotation-angle-measuring device is designed to record the rotation angle covered by the screwdriver shaft, the housing of the power-operated screwdriver being used as the reference for the rotation angle of the screwdriver shaft. In the case of handguided power-operated screwdrivers, which have to forgo a support securing their position in space, the operator of the power-operated screwdriver reacts variably to a developing torque, as a result of which this motion is superimposed upon the rotation angle of the screwdriver shaft. This fact is particularly disadvantageous in the end-tightening which is important for the evaluation of the screw connection, since here the housing is very often deflected or deviates to a considerable degree, thereby making the values determined in this period extremely unreliable.

An object of the invention is to further improve the tools of the above-described general types while maintaining their advantages and facilities, namely an accurate and absolute recording of the rotation angle of the screw or nut to be tightened and a process monitoring for all known screwing methods, by providing further advantages of (i) a simple design,
(ii) comfortable and fast tool maneuverability; and
(iii) universal applicability, irrespective of the local conditions in the environment of the screw or other threaded connection location.

This object is achieved according to the preferred embodiments of the invention by a system which is capable of:

determining a first angle corresponding to the rotation angle of the drive part with respect to the housing, determining a second angle corresponding to the rotation angle of the housing with respect to a fixed point, and determining an absolute rotation angle of the drive pare with respect to the fixed point by combining the first and second angles.

As a result of the determination of the absolute rotation angle in certain preferred embodiments with respect to the screwdriver or tool shaft aligned parallel to the screw-in axis of the screw connection, with the aid of an inertial rotation-rate sensor, which is assigned to the housing and/or to the screwdriver shaft parallel to the swivel axis and which replaces the fixed spatial point of the generic type by a spatially fixed virtual fixed point, in the case of the rotation-angle-monitored screwing-in tool, hereinafter referred to as a screwdriver such as, for example, a torque spanner or power-operated screwdriver, a simple construction, comfortable and fast maneuverability and universal usability are achieved.

Older power-operated screwdrivers which are driven by drive shafts and are rotation-angle-monitored by increment transmitters, for example, can also be easily retrofitted with the same rotation-rate sensor for good rotation-angle determination. This can be effected by the fact that, using the rotation-rate sensor, a deflection of the housing about the screwdriver shaft and hence about the screw-in axis of the screw connection is determined and is added, in a manner producing a correct digit-sign (rotational direction sign), to the number of rotations, determined by means of the increment transmitter, of the drive and/or screwdriver shaft, thereby enabling the correction of a rotation angle which has been erroneously determined in the event of the housing having been deflected about the screwdriver shaft.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
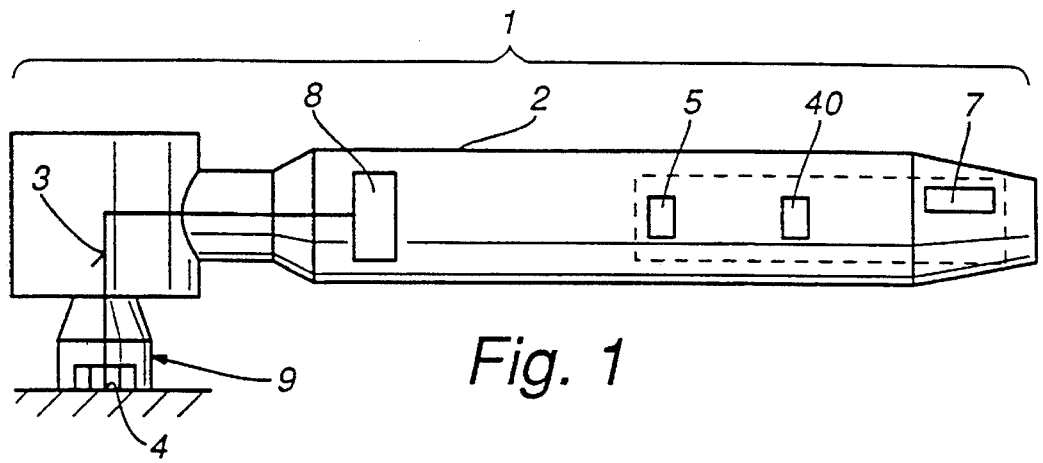
FIG. 1 is a schematic side view which shows a screwdriver in the style of a hand-guided offset screwdriver.
Figure 2:
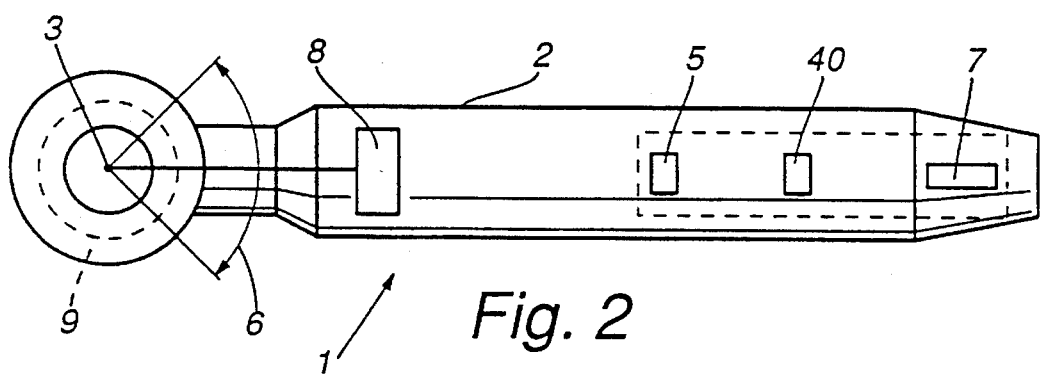
FIG. 2 shows a top view of the screwdriver according to FIG. 1.

FIGS. 1 and 2 show a schematic side view and a schematic top view of a screwdriver 1 which is constructed in the style of a hand-guided power-driven offset screwdriver. In the housing 2 of the screwdriver 1, which housing is principally configured as a handpiece, there is disposed a torque-measuring device 8 and a rotation-angle-measuring device (compare 13, 23, 33 of FIGS. 3–7). By a torque-measuring device 8 and a rotation-angle-measuring device 13, 23, 33 are also meant those systems which control or analyze screwing or threading courses by means of motor current—indirect torque measurement—and rotor position—indirect rotation-angle measurement. Using the torque-measuring device 8, the torque delivered to the screwdriver shaft 3 is recorded.

Denoted as the screwdriver shaft 3 is that part of the drive shaft of the screwdriver 1 which supplies the tightening force required for the screw connection, which part coincides with the rotation axis of the screw connection, which is also, at the same time, the axis of symmetry of the plug-in insert (socket). Screwdriver shaft 3 is disposed in the screw head 9 of the screwdriver 1. The rotation angle which the screwdriver shaft 3 covers in relation to the housing 2 of the screwdriver 1 is recorded by an angle-measuring device 5 of conventional design, e.g. an increment transmitter.

Whenever the housing 2 of the screwdriver 1 is deflected about the screwdriver shaft 3, a thereby created deflection angle 6 of the housing 2 is superimposed upon the hitherto determined rotation angle of the screwdriver shaft 3 in relation to the housing 2 of the screwdriver 1. The desired predetermined absolute rotation angle at a predetermined torque is a function of the absolute rotation angle of the shaft 3 with respect to the fixed point 4. To enable the absolute rotation angle of the screwdriver shaft 3 to be determined in relation to the virtual fixed point 4, the screwdriver 1 exhibits a housing deflection-angle-measuring device 7, which records the deflection angle 6 of the housing 2 of the screwdriver 1 about the virtual fixed point 4. The virtual fixed point 4 is herein secured, on the workpiece side, by the rotation axis of the screw connection, which axis coincides with the screwdriver shaft 3.

Specific preferred embodiments of the housing deflection-angle-measuring device 7 are able to record the deflection angle 6, as the measured variable, in principle directly or indirectly via the rotation frequency or indirectly via the rotational acceleration of the deflection motion. These preferred embodiments exhibiting separate determination of the relative rotation angle of the screwdriver shaft 3 and of the deflection angle 6 of the housing 2 are discussed with reference to the description of FIGS. 2 to 7.

In order to determine the absolute rotation angle of the screwdriver shaft 3 in relation to the virtual fixed point 4, data is recorded by the angle-measuring device 5 and by the housing deflection-angle-measuring device 7. This data is processed, as appropriate, in a subtraction device 40 likewise assigned to the rotation-angle-measuring device 13, 23, 33. In the subtraction device 40, the relative rotation angle of the screwdriver shaft 3 in relation to the housing 2, recorded by the angle-measuring device 5, and the measured variable recorded by the housing-deflection-angle-measuring device 7, the deflection angle 6 of the housing 2, are processed and linked to each other in a manner producing a correct digit-sign (correct angular direction) to obtain the absolute rotation angle.

For the protection of the housing deflection-angle-measuring device 7, it is sensible to dispose the housing deflection-angle-measuring device 7 within the housing 2 of the screwdriver 1. However, it can also be advantageous on the other hand in certain preferred embodiments to dispose the housing deflection-angle-measuring device 7 on the outside of the housing 2 of the screwdriver 1, since this enables older screwdrivers also to be easily retrofitted.

Figure 3:
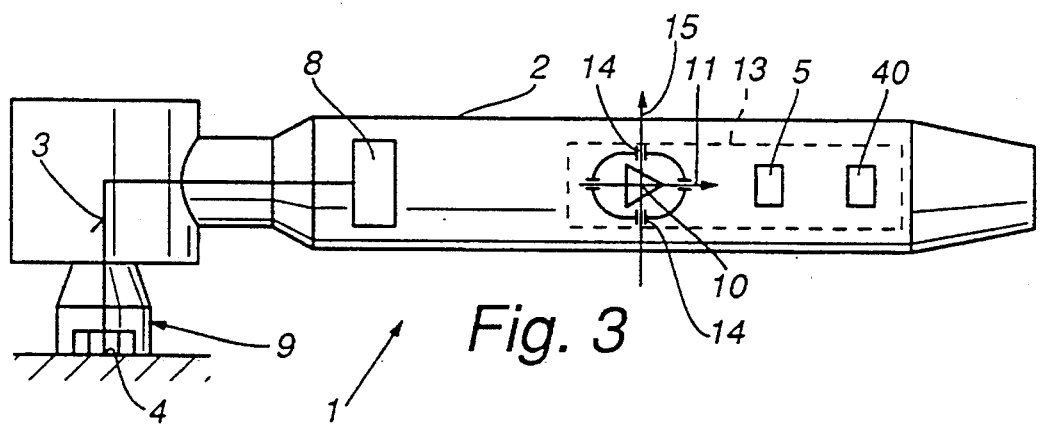
FIG. 3 is a schematic side view of a screwdriver according to FIG. 1, having a mechanical gyroscope disposed in the housing of the screwdriver for recording the deflection angle of the housing.
Figure 4:
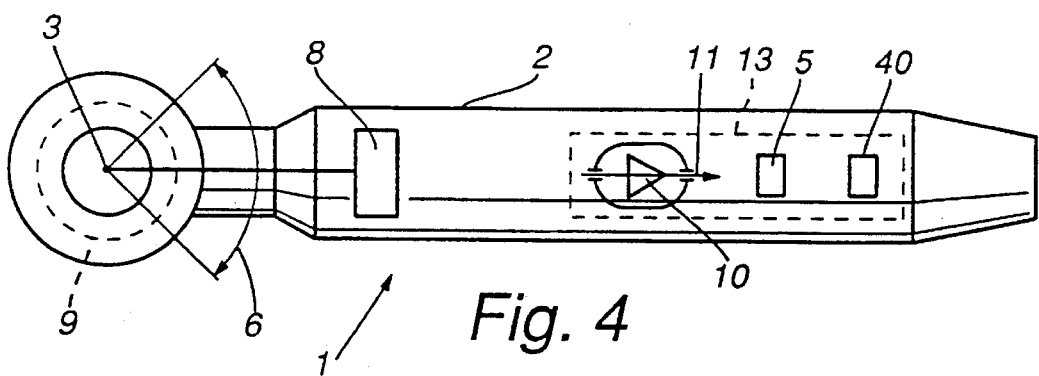
FIG. 4 shows a top view of the screwdriver according to FIG. 3.

FIGS. 3 and 4 show a side view and a top view of a screwdriver 1, whose housing deflection-angle-measuring device 7 is configured as a mechanical gyroscope 10. The gyroscope 10 is configured like a compass and is floatingly mounted. The gyro axis 11 of the mechanical gyroscope 10 is disposed transversely to the screwdriver shaft 3. In the housing 2 of the screwdriver 1, the mechanical gyroscope 10 can be swivelled by a swivel mounting 14 about a swivel axis 15 aligned parallel to the screwdriver shaft 3, as a result of which the gyroscope remains motionless in a space whenever the housing 2 deflected. The deflection angle 6 is then obtained directly from the angle between the gyro axis 11 and the deflected position of the housing 2 in a space. In this case, as the measured variable, the deflection angle 6 is measured directly and passed to the subtraction unit 40 of the rotation-angle-measuring device 13 belonging to this mechanical gyroscope 10 and the absolute rotation angle of the screwdriver shaft 3 is defined in relation to the virtual fixed point 4 on the workpiece side.

Figure 5:
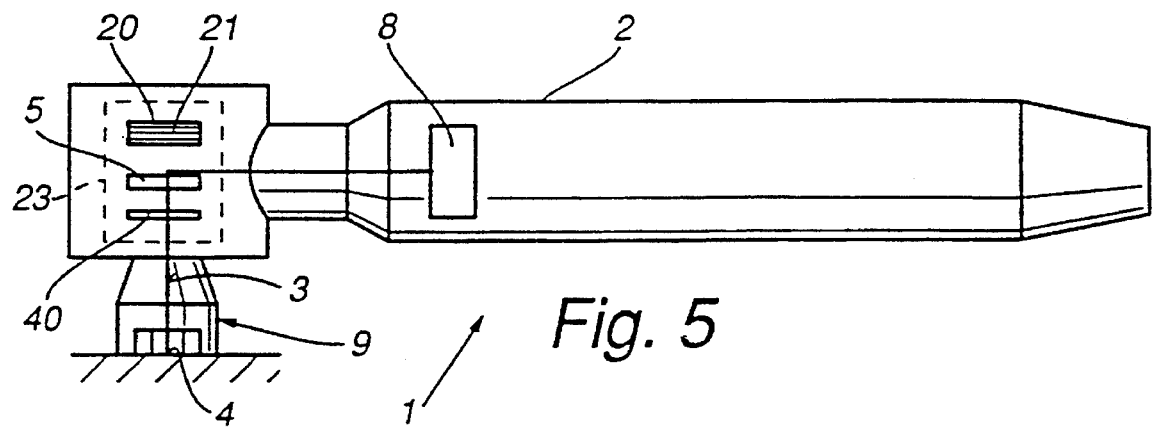
FIG. 5 is a schematic side view of a screwdriver according to FIG. 1, having an optical gyroscope disposed in the housing of the screwdriver for recording the rotation frequency of the housing.
Figure 6:
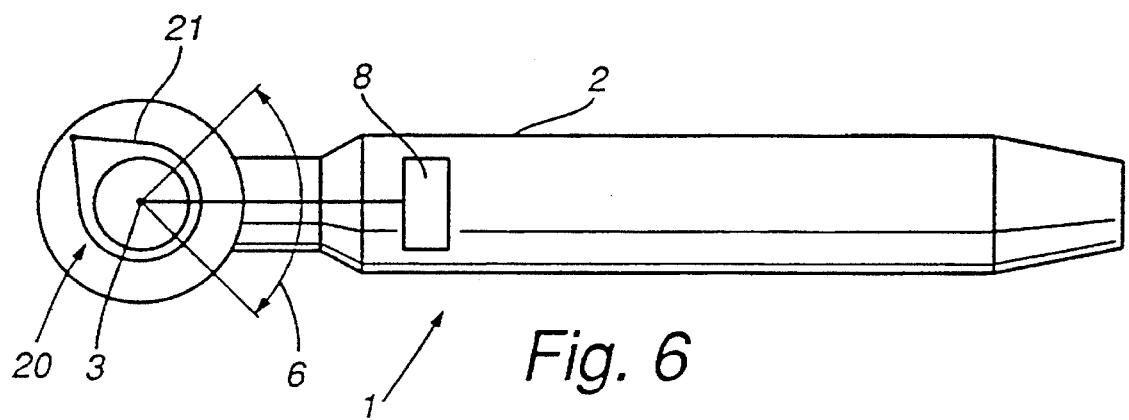
FIG. 6 shows a top view of the screwdriver according to FIG. 5.

FIGS. 5 and 6 show a side view and a top view of a screwdriver 1 whose housing deflection-angle-measuring device 7 is configured as an optical gyroscope 20. The optical gyroscope 20 exhibits a glass fiber 21 wound in one plane about an axis of symmetry, the glass fiber 21 forming the light-path of the optical gyroscope 20. For the measurement of the rotation frequency $\Omega$ of a deflection of the housing 2, the plane of the optical gyroscope 20 secured by the light-path of the gyroscope 20, is aligned perpendicular to the screwdriver shaft 3 about which the deflection of the screwdriver 1 is effected; i.e. the axis of symmetry of the windings of the glass fiber(s) 21 forming the lightpath is aligned parallel, in the present case coaxially, to the screwdriver shaft 3. The rotation frequency $\Omega$ of the deflection of the housing 2 is proportional to a difference in running time, which difference occurs in the event of a deflection motion, of a divided light wave led in opposite directions through the glass fiber(s) 21 of the optical gyroscope 20. The rotation frequency Ω derived from the difference in running time is integrated and the arithmetically determined deflection angle 6 is passed to a subtraction device 40 of the rotation-angle-measuring device 23 belonging to the optical gyroscope 20 and the absolute rotation angle of the screwdriver shaft 3 is defined in relation to the virtual fixed point 4 on the workpiece side.

In place of the optical gyroscope 20 described in FIGS. 5 and 6, a piezoelectric gyroscope which is cheaper and also perfectly satisfies the present needs can also be used. Such a piezoelectric gyroscope is known from the corporate publication of the company "MURATA MFG. CO. LTD." entitled "GYROSTAR™ breaks the precision barrier—a hundred times the precision for a tenth of the conventionals", print reference 1991.3.3KTD 558.

Figure 7:
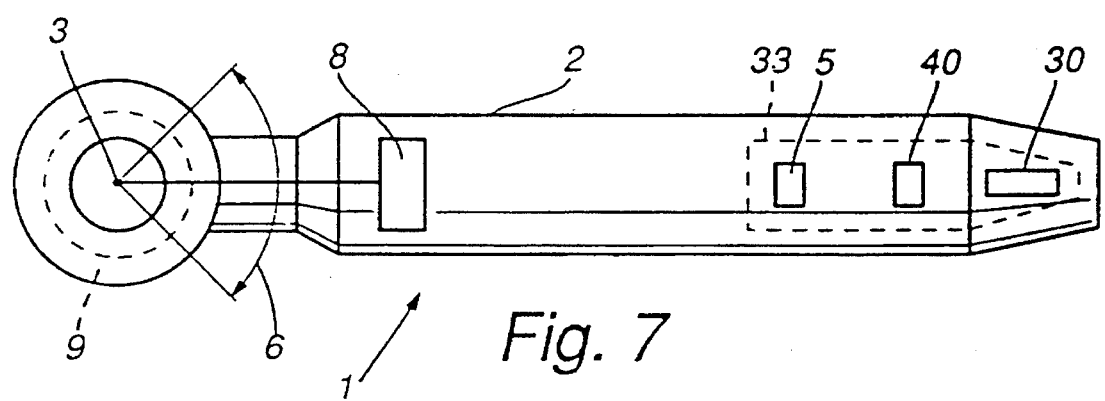
FIG. 7 is a top view of a screwdriver according to FIG. 1, having an acceleration sensor disposed in the housing of the screwdriver for recording the rotational acceleration of the housing.

FIG. 7 shows a top view of a screwdriver 1, whose housing deflection-angle-measuring device 7 is configured as an acceleration sensor 30. The acceleration sensor 30, which is fitted at a defined distance from the screwdriver shaft 3 running through the virtual fixed point 4, records the angular acceleration of this deflection. The measured variable thus recorded is doubly integrated for the determination of the deflection angle 6. The arithmetically determined deflection angle 6 is passed to the subtraction device 40 of the rotation-angle-measuring device 33 belonging to the acceleration sensor 30 and the absolute rotation angle of the screwdriver shaft 3 is defined in relation to the virtual fixed point 4 on the workpiece side.

In the case of power-operated screwdrivers which are to be newly manufactured, it is sensible to assign the rotation-rate sensor directly to the screwdriver shaft 3, since the absolute rotation angle can thereby be determined via the screwdriver shaft 3, the complexity being substantially less on the structural part side. Such an amalgamation of the screwdriver shaft 3 and the rotation rate sensor is described with reference to the following illustrative embodiments of torque wrenches or spanners, the principles also being transferable to power-operated screwdrivers having power-driven screwdriver shafts 3.

Figure 8:
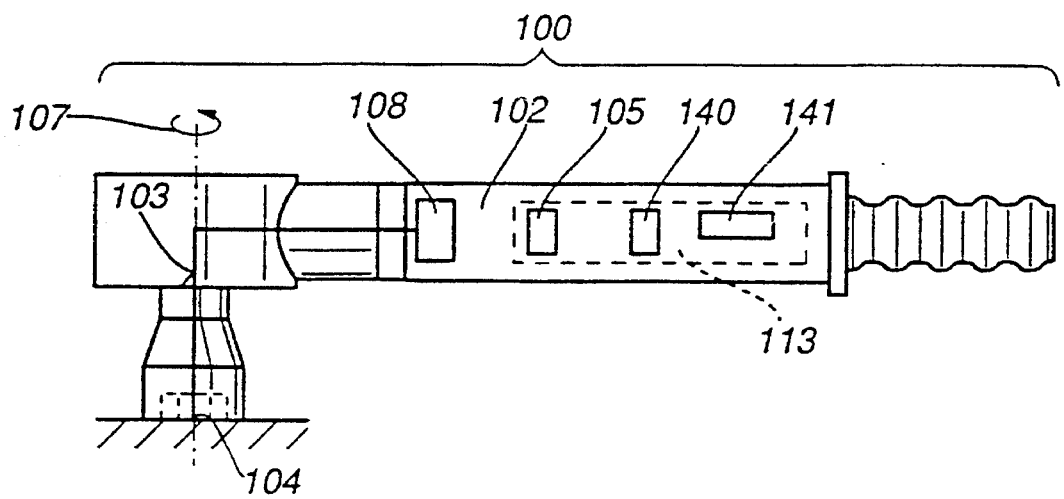
FIG. 8 is a schematic side view of a screwdriver configured in the style of a torque spanner.
Figure 9:
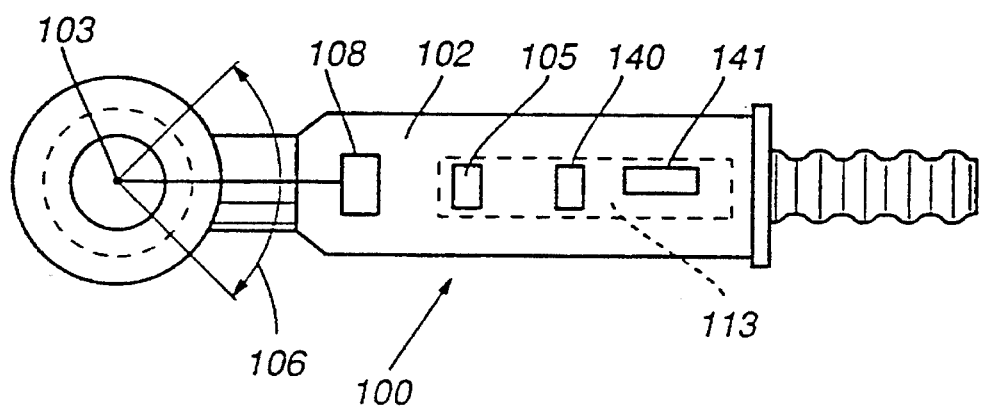
FIG. 9 shows a top view of the torque spanner according to FIG. 8.

FIGS. 8 and 9 show a side view and a top view of a screwdriver 100 in the style of a torque spanner, which is provided with a torque-measuring device 108 and with a rotation-angle-measuring device 113. The rotation-angle-measuring device 113 assigned rigidly to the housing 2 of the screwdriver 1, which housing is configured as a hand lever, exhibits a rotation-rate sensor 105, which is designed to record the absolute rotation-angle of the screwdriver shaft 103 in relation to the virtual fixed point 104. At low to negligible torsion of the screwdriver shaft 103, the rotation angle corresponds approximately to the deflection angle 106 of the housing 2 or of the hand lever of the screwdriver 100 about the virtual fixed point 104. The virtual fixed point 104 is secured on the workpiece side by the rotation axis, coaxial to the swivel axis 107 of the screwdriver 100, of the screw connection, these two axes likewise being coaxial to the screwdriver shaft 103. The zero-angle position belonging to the fixed point 104 is favorably obtained from the angular position, belonging to a predefinable torque, of the screwdriver shaft 103 and/or of the housing 102. Where the deflection angle 106 of the housing 102 is recorded in order to determine the rotation angle of the screwdriver shaft 103, it is sensible, where there is torsion of the screwdriver shaft 103, to provide the rotation-angle-measuring device 113 with a subtraction unit 140, in which the torsion angle of the screwdriver shaft 103 is deducted from the recorded deflection angle 106 of the housing 102.

Advantageously, the subtraction unit 140 exhibits an electronic data store 141 for this purpose. Data store 141 contains the torsion angle at the given torque belonging to the zero-angle position or contains the torsion angle as a function of the torque delivered to the screwdriver shaft 103. Specific configurations of the rotation-rate sensor 105 are discussed with reference to the description of FIGS. 10 to 13. These rotation rate sensors are able to record, as a measured variable, the rotation angle of the screwdriver shaft 103 or the deflection angle 106 of the hand lever 102 in principle directly or indirectly via the rotation velocity, or indirectly via the rotational acceleration of the rotation or deflection motion.

For the protection of the rotation-rate sensor 105, it is sensible to dispose the rotation-rate sensor 105 within the housing 102 of the screwdriver 100 configured as a torque spanner. In order to enable older torque spanners to be easily retrofitted, it can also however be favorable to dispose the rotation-rate sensor 105 on the outside of the housing 102 of the screwdriver 100.

In order to reduce errors in measuring the rotation angle, which errors can occur in the tightening or loosening of a screw connection from torsion of the screwdriver shaft 103, it is sensible to assign the rotation-rate sensor 105 directly to the screwdriver shaft 103.

Figure 10:
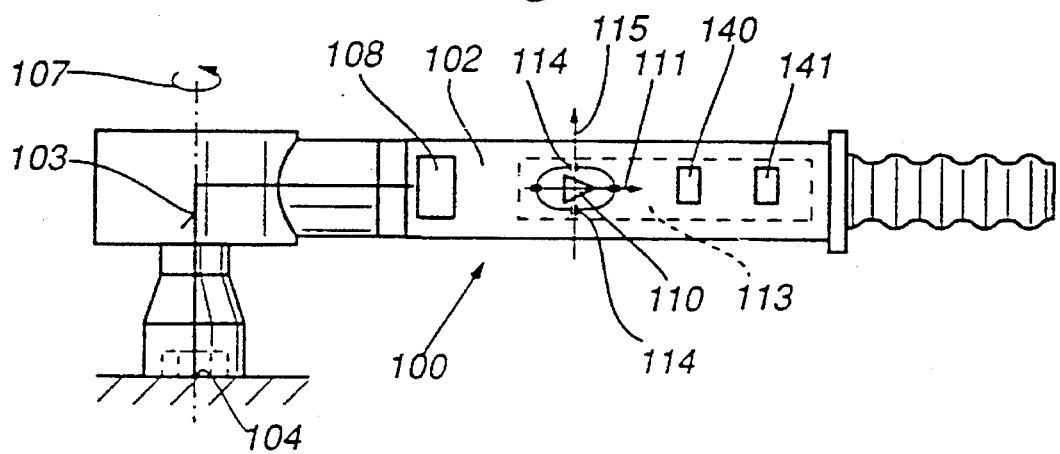
FIG. 10 is a schematic side view of a further torque spanner, having a mechanical gyroscope as the rotation-rate sensor.
Figure 11:
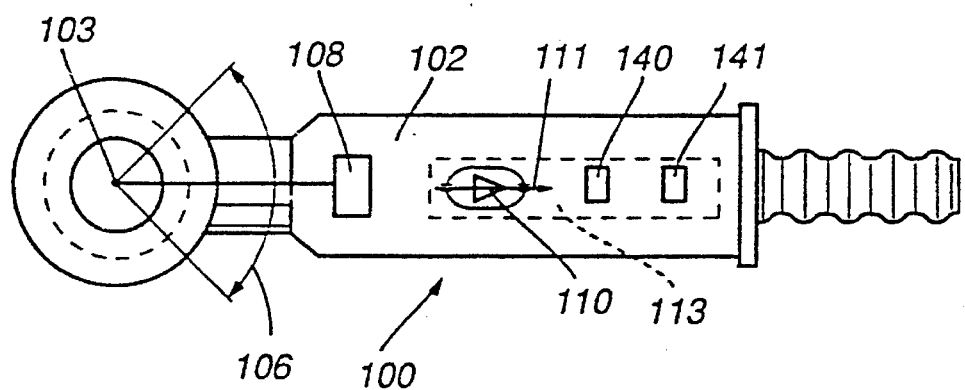
FIG. 11 shows the torque spanner according to FIG. 10 in top view.

FIGS. 10 and 11 show a side view and a top view of a screwdriver 100, which is broadly structurally identical to FIGS. 8 and 9 and whose rotation-rate sensor 105 is configured as a mechanical gyroscope 110. The gyroscope 110 is configured like a compass and floatingly mounted. The gyro axis 111 of the mechanical gyroscope 110 is disposed transversely to the screwdriver shaft 103. In the housing 102 of the screwdriver 100, the mechanical gyroscope 110 can be swivelled by a gyro swivel mounting 114 about a gyro swivel axis 115 aligned parallel to the screwdriver shaft 103, as a result of which the mechanical gyroscope 110, conditioned by the maintenance of angular momentum, is able to remain motionless in a space whenever the housing 102 is deflected. The deflection angle 106 of the housing 102 is then obtained directly from the angle between the angular position of the gyro axis 111, corresponding to the zero position, and the deflected position of the housing 102 in a space, in the case of a full pivot about the swivel axis 107, 360° being added thereto. In the case of a mechanical gyroscope 110 disposed in or on the housing 102 of the screwdriver 100, the deflection angle 106 is measured directly as the measured variable. Depending on the torsion angle of the screwdriver shaft 103, the deflection angle 106 can then be regarded as the absolute rotation angle of the screwdriver shaft 103 in relation to the virtual fixed point 104 on the workpiece side, or has to be corrected, as already described with reference to FIGS. 8 and 9, using the corresponding torsion angle.

Here too it can be sensible, in order to avoid errors conditioned by the torsion, either to configure the screwdriver shaft 103 to be largely free from torsion under the forces which are generated and/or to assign the mechanical gyroscope 110 directly to the screwdriver shaft 103.

Figure 12:
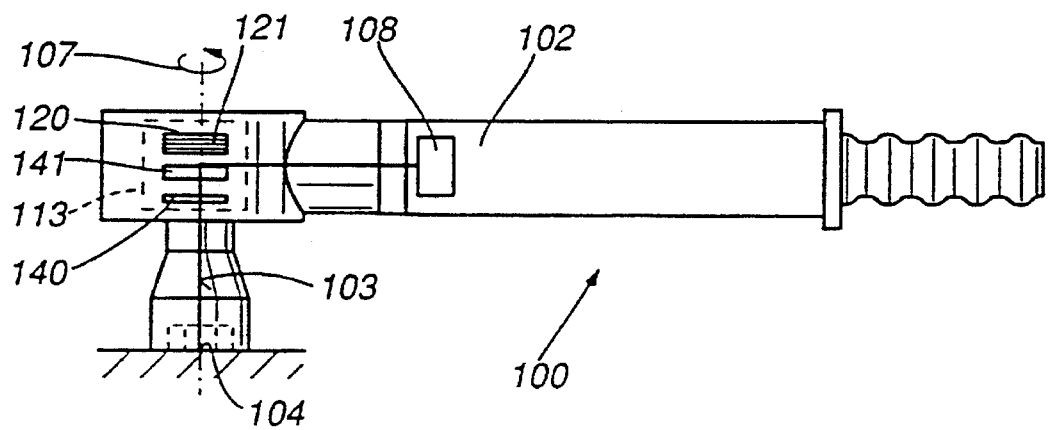
FIG. 12 is a schematic side view of a torque spanner, having an optical gyroscope as the rotation-rate sensor, in top view.

FIG. 12 shows a torque spanner which is likewise broadly structurally identical to the screwdriver 100, configured as a torque spanner, according to FIG. 8. The rotation-sensitive rotation-rate sensor 105 of this screwdriver 100 is configured as an optical gyroscope 120, which detects the rotation velocity. The optical gyroscope 120 exhibits a wound glass fiber 121, which forms the light-path of the optical gyroscope 120. It is also conceivable for a, for example, spirally wound optical wave guide to be inlaid into a small glass plate using integrated-optical technology. The angular resolution of the measuring systems does not need to be particularly high. In order to measure the rotation velocity during the deflection of the housing 102 or the hand lever, the plane of the optical gyroscope 120, which plane is secured by the light-path of the said optical gyroscope 120, is aligned perpendicular to the screwdriver shaft 103 or swivel axis 107, about which swivel axis 107 the deflection of the screwdriver 100 is effected. Based on the deflection of the housing 102, the rotation frequency which can be determined using the optical gyroscope 120 is proportional to a difference in running time, which difference occurs in the event of a deflection motion, of a divided light wave which, following the division, is led in opposite directions through the glass fiber(s) 121 of the optical gyroscope 120. The rotation velocity derived from the difference in running time is integrated and the arithmetically determined deflection angle 106 is passed to a subtraction device 140 of the rotation-angle-measuring device 113 belonging to the optical gyroscope 120. In the subtraction device 140, which simultaneously operates as an analyzing unit, the absolute rotation angle of the screwdriver shaft 103 in relation to the spatially fixed, virtual fixed point 104 is defined by correction of the existing torsion angle of the screwdriver shaft 103.

In place of the optical gyroscope 120 described in FIG. 12, a piezoelectric gyroscope (not included in the drawing) which satisfies the present needs can also be used which is substantially cheaper in comparison to the optical gyroscope 120. One possible piezoelectric gyroscope is known, for example, from the corporate publication of the company "MURATA MFG. CO. LTD." entitled "GYROSTAR™ breaks the precision barrier a hundred times the precision for a tenth of the conventionals™, print reference 1991.3.3KTD 558.

Figure 13:
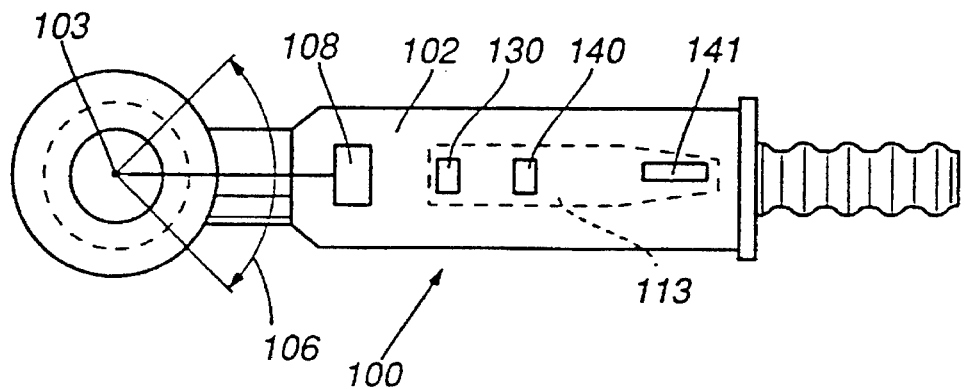
FIG. 13 is a schematic view of a torque spanner having an acceleration sensor as the rotation-rate sensor.

FIG. 13 shows a torque spanner whose rotation-rate sensor 105 is configured as an acceleration sensor 130. The acceleration sensor 130, which is fitted at a defined distance from the swivel axis 107 running through the virtual fixed point 104, records the angular acceleration of this deflection. The measured variable thus recorded is doubly integrated for the determination of the deflection angle 106. The arithmetically determined deflection angle 106 is passed to the subtraction device 140 of the rotation-angle-measuring device 113 belonging to the acceleration sensor 130 and the absolute rotation angle of the screwdriver shaft 103 is defined in relation to the virtual fixed point 104 on the workpiece side in the manner previously described.

It should be borne in mind that where a conventional acceleration sensor is used, measuring errors of differing magnitudes result from the influence of gravity-based acceleration, depending on whether the vector of the acceleration to be determined lies at right-angles to the gravitational direction or positively or negatively parallel to it or diagonally to it. In order to eliminate such an error, the total acceleration obtained from the sum of the rotational acceleration and the gravity-based acceleration should firstly be determined by means of a three-dimensionally sensitive acceleration sensor and the vector of the gravity-based acceleration, which vector is to this extent constant, vectorially deducted therefrom, which does not however constitute a problem, given the data-processing technology which is nowadays available.

In all illustrative embodiments of the power-operated screwdrivers and torque spanners, the determination of the rotation angle is sensibly only effected from a specific, predefinable starting torque. As the zero angle position, that angular position of the swivel axis 103 or of the housing 102 is herein used, in which the starting torque in question is reached. Those measured data originating from the rotation-rate sensor and belonging to the rotation angle are passed to an analyzing unit integrated in the housing 2, 102 and assigned to the torque-measuring device 8, 108 and/or to the rotation-angle-measuring device 13, 23, 33, 113, are analyzed therein and the correspondingly determined torque or the associated rotation angle, in particular, is indicated on a display.

In association with the rotation-rate sensors based on the principle of acceleration measurement, reference should be made, for the sake of completeness, to those silicon acceleration sensors known per se, in which a small tongue, serving as a weight/spring system, is freely etched out of a silicon wafer supporting an integrated switching circuit. In the root region of the freely etched tongue, there is integrated a grate which, depending on the extent and direction of the acceleration-conditioned deflection of the tongue, is variably heavily deformed. This deformation is correspondingly detected in the integrated switching circuit and converted into an electric signal, which can be amplified in a small pre-amplifier—likewise integrated in the silicon wafer—and passed on in the outward direction.

Advantageously, the rotation-angle-measuring device 13, 23, 33, 113 and/or the torque-measuring device 8, 108 also exhibit a further electronic, possibly temporary data store 141 having an integrated energy supply, enabling the data of at least one single preceding screw connection to be stored.

In addition, the indicating device can additionally exhibit a preferably cableless transmitting unit, for example an infrared transmitter, via which the determined data of the screw connections can be fed to an external data-processing and storage unit.

In the case of a torque spanner provided with ratchets or a catch mechanism, for defining the cumulative rotation angle of a plurality of successive tightening motions, the signals only of the desired direction of rotation, generally the direction of tightening, originating from the rotation-rate sensor 105 are recorded and these individual data are added up. It can also be sensible to take into account and add up only those rotation angles which are covered after the last active, highest tightening torque has been exceeded.

It has further proved to be favorable to provide the torque spanners with a catch-release unit which, when a predefinable torque, a predefinable rotation angle, the yield point or some other predefinable switch-off threshold is reached, prevents the screw connection from being additionally rotated onward by hand or makes clear to the operator, by "buckling", that the switch-off value has been reached. Examples of further predefinable switch-off thresholds would be a specific rise in the torque/rotation-angle characteristic line of the tightening operation or combinations of different monitoring variables which are used one after the other within one and the same tightening operation; in this context, mention should also be made of the assembly gradient processing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for rotatably driving a threaded fastener using a tool of the type having a housing and a rotatable fastener drive part carried by the housing, said process comprising:
  determining a first angle corresponding to the rotation angle of the drive part with respect to the housing,
  determining a second angle corresponding to the rotation angle of the housing with respect to a fixed point, and
  determining an absolute rotation angle of the drive part with respect to the fixed point by combining the first and second angles.

2. Process according to claim 1, wherein said tool is a power driven tool with a hand held housing, and further comprising determining when a predetermined tool tightening torque has been reached during tightening of a threaded fastener connection with said tool.

3. Process according to claim 2, wherein said determining of said first and second angles is commenced after said determining of the predetermined tool tightening torque.

4. Process according to claim 3, further comprising controlling the operation of the tool as a function of the determined absolute rotation angle.

5. Process according to claim 2, further comprising controlling the operation of the tool as a function of the determined absolute rotation angle.

6. Process according to claim 3, wherein said combining of the first and second angles is done using an electronic unit carried by the housing.

7. Process according to claim 1, wherein said fixed point is located on an axis which is parallel to the drive part rotational axis.

8. Process according to claim 7, wherein said fixed point is located on the drive part rotational axis.

9. Process according to claim 1, wherein said determining said second angle includes directly sensing the rotative position of the housing.

10. Process according to claim 9, wherein said determining said second angle includes using a gyroscope to generate a second angle signal.

11. Process according to claim 1, wherein said determining said second angle includes sensing the rotation velocity of the rotation of the housing and then integrating and correlating the rotation angle with the determined first angle to determine said absolute rotation angle.

12. Process according to claim 11, wherein said sensing the rotation velocity includes using an optical gyroscope.

13. Process according to claim 1, wherein said determining of said second angle includes sensing the angular acceleration of the housing and then doubly integrating and correlating the sensed rotation angle with the determined first angle to determine said absolute rotation angle.

14. Tool apparatus for rotatably driving a threaded fastener including a tool of the type having a housing and a rotatable fastener drive part carried by the housing, said tool apparatus comprising:
  a first angle determining device for determining a first angle corresponding to the rotation angle of the drive part with respect to the housing,
  a second angle determining device for determining a second angle corresponding to the rotation angle of the housing with respect to a fixed point, and
  an absolute rotation angle determining device for determining an absolute rotation angle of the drive part with respect to the fixed point by combining the first and second angles.

15. Tool apparatus according to claim 14, wherein said tool is a power driven tool with a hand held housing, and further comprising a torque determining device for determining when a predetermined tool tightening torque has been reached during tightening of a threaded fastener connection with said tool.

16. Tool apparatus according to claim 15, wherein said devices are operable such that said determining of said first and second angles is commenced after said determining of the predetermined tool tightening torque.

17. Tool apparatus according to claim 16, further comprising tool control apparatus for controlling the operation of the tool as a function of the determined absolute rotation angle.

18. Tool apparatus according to claim 16, wherein an electronic unit carried by the housing is used to combine the first and second angles.

19. Tool apparatus according to claim 15, wherein said hand held housing rotates radially from the drive part rotational axis.

20. Tool apparatus according to claim 14, further comprising tool control apparatus for controlling the operation of the tool as a function of the determined absolute rotation angle.

21. Tool apparatus according to claim 20, wherein said second angle determining device includes a gyroscope.

22. Tool apparatus according to claim 21, wherein said gyroscope is a mechanical gyroscope.

23. Tool apparatus according to claim 20, wherein an electronic data processing device is provided for combining the first and second angles, said data processing device being carried on the housing.

24. Tool apparatus according to claim 23, wherein said data processing device includes apparatus for initiating tool control signals as a function of torque applied to the fastener drive part and of the absolute rotation angle.

25. Tool apparatus according to claim 24, wherein said data processing device includes a subtraction unit for linking the second angle with a drive part torsion angle present at a known torque.

26. Tool apparatus according to claim 14, wherein said fixed point is located on an axis which is parallel to the drive part rotational axis.

27. Tool apparatus according to claim 26, wherein said fixed point is located on the drive part rotational axis.

28. Tool apparatus according to claim 14, wherein said second angle determining device includes apparatus directly sensing the rotative position of the housing.

29. Tool apparatus according to claim 28, wherein said second angle determining device includes a gyroscope.

30. Tool apparatus according to claim 14, wherein said second angle determining device includes apparatus sensing the rotation velocity of the rotation of the housing and apparatus for integrating and correlating the rotation angle with the determined first angle to determine said absolute rotation angle.

31. Tool apparatus according to claim 30, wherein said apparatus sensing the rotation velocity includes an optical gyroscope.

32. Tool apparatus according to claim 30, wherein said apparatus sensing the rotation velocity include a gyroscope.

33. Tool apparatus according to claim 32, wherein said gyroscope is an optical gyroscope.

34. Tool apparatus according to claim 32, wherein said gyroscope is a piezoelectric gyroscope.

35. Tool apparatus according to claim 14, wherein said second angle determining device includes apparatus sensing the angular acceleration of the housing and apparatus for doubly integrating and correlating the sensed rotation angle with the determined first angle to determine said absolute rotation angle.

36. Tool apparatus according to claim 14, comprising a rotation rate sensor assigned directly to the tool drive shaft.

* * * * *